(12) United States Patent
Landry

(10) Patent No.: US 7,275,717 B2
(45) Date of Patent: Oct. 2, 2007

(54) HELICOPTER ONE-PIECE DOOR

(75) Inventor: Martin Landry, St-Jerome (CA)

(73) Assignee: Bell Helicopter Textron Inc., Hurst, TX (US)

( * ) Notice: Subject to any disclaimer, the term of this patent is extended or adjusted under 35 U.S.C. 154(b) by 1 day.

(21) Appl. No.: 11/131,190

(22) Filed: May 18, 2005

(65) Prior Publication Data

US 2006/0261216 A1   Nov. 23, 2006

(51) Int. Cl.
B64C 1/14    (2006.01)

(52) U.S. Cl. .................................. 244/129.5

(58) Field of Classification Search ............ 244/129.4, 244/129.5, 137.3, 118.2, 1 TD; 49/205; 248/920–921
See application file for complete search history.

(56) References Cited

U.S. PATENT DOCUMENTS

| | | | | |
|---|---|---|---|---|
| 2,923,981 | A | * | 2/1960 | Beck .......................... 49/205 |
| 3,128,068 | A | * | 4/1964 | Pauli ....................... 244/129.5 |
| 4,167,258 | A | * | 9/1979 | Robertson ................ 244/129.5 |
| 4,220,298 | A | | 9/1980 | Willis |
| 4,498,648 | A | | 2/1985 | DeLuca et al. |
| 4,729,533 | A | * | 3/1988 | Hillary et al. .............. 248/920 |
| 4,890,751 | A | * | 1/1990 | Opdahl ..................... 244/1 TD |
| 4,895,321 | A | | 1/1990 | Huhn et al. |
| 5,181,677 | A | | 1/1993 | Kaplan et al. |
| 5,562,264 | A | | 10/1996 | Bietenhader |
| 5,738,316 | A | * | 4/1998 | Sweere et al. .............. 248/920 |
| 5,799,917 | A | * | 9/1998 | Li ............................. 248/921 |
| 5,806,627 | A | | 9/1998 | Wilson |
| 5,915,649 | A | | 6/1999 | Head |
| 6,126,114 | A | | 10/2000 | Victor |
| 6,168,114 | B1 | | 1/2001 | Erben |
| 6,220,546 | B1 | * | 4/2001 | Klamka et al. .......... 244/129.4 |
| 6,474,600 | B1 | | 11/2002 | Apps |
| 6,488,236 | B2 | | 12/2002 | Landry |
| 6,568,637 | B2 | | 5/2003 | Bluem et al. |
| 6,619,372 | B2 | | 9/2003 | Bold et al. |
| 6,729,581 | B2 | | 5/2004 | Buchs et al. |
| 6,742,744 | B2 | | 6/2004 | Schreitmueller et al. |

FOREIGN PATENT DOCUMENTS

DE    12 45 747    7/1967
FR    1 319 437    3/1963

* cited by examiner

Primary Examiner—Timothy D. Collins
(74) Attorney, Agent, or Firm—Pillsbury Winthrop Shaw Pittman LLP

(57) ABSTRACT

An aircraft vehicle includes a body, including a front portion and a rearward tail portion, a single panel door constructed and arranged to close an access opening defined in a lower portion of the body, and a linkage between the body and the door. The linkage is constructed and arranged to move the door generally rearwardly and upwardly when the door is moved from a closed position to an opened position, so that the door is positioned below and adjacent to the rearward tail portion.

25 Claims, 19 Drawing Sheets

HELICOPTER ONE-PIECE DOOR

BACKGROUND OF THE INVENTION

1. Field of the Invention

The present invention relates to an aircraft door and, more particularly, to a door that is mounted to an access opening of a helicopter.

2. Description of Related Art

A helicopter generally includes a fuselage in which access openings are provided. These access openings are designed to enable people to board the helicopter and to load freight inside storage areas. Each access opening is equipped with a door, which essentially includes an outer skin attached to a framework. When the door is closed, the outer skin extends flush with the surrounding surface contour of the fuselage skin. Each door is conventionally secured to the fuselage by using a hinge mechanism in which the door is opened by being swung in an arc about its hinges. The procedure is reversed in order to close the door.

The cantilevered load that acts upon the hinge mechanism of a door when the door is opened may be significant due to the weight of the door and exposure to wind. Thus, the size of the access openings into which doors are mounted is generally limited. However, such size limitation may not be desirable for access openings arranged in the rear portion of a helicopter since they may be used to load freight or accommodate stretchers and emergency personnel during medi-vac operations. Thus, in order to increase the size of a rear access opening of a helicopter, two door panels are generally used. The door panels are configured as French doors and open towards the outside of the helicopter. Because two doors are used, they can be made smaller, and thereby lighter, than a single panel door.

Although a two-panel door may significantly minimize the load that acts upon the hinge mechanism of each panel, such a door remains heavy and its opening and closing may take longer and be more cumbersome. Specifically, each of the two panels must be handled one after the other and in precise order to carry out a closing that ensures proper closing and opening. In addition, such a door may be more difficult to seal due to the extra linear split at the centerline defined between the panels.

BRIEF SUMMARY OF THE INVENTION

In an embodiment of the invention, there is provided an aircraft vehicle that includes a body, including a front portion and a rearward tail portion, a single panel door constructed and arranged to close an access opening defined in a lower portion of the body, and a linkage between the body and the door. The linkage is constructed and arranged to move the door generally rearwardly and upwardly when the door is moved from a closed position to an opened position, so that the door is positioned below and adjacent to the rearward tail portion.

In another embodiment of the invention, there is provided a door for closing an access opening of a helicopter, the helicopter having a body including a front portion and a rearward tail portion. The door includes a single panel door, and a linkage between the body and the single panel door, the linkage being constructed and arranged to move the single panel door generally rearwardly and upwardly when the door is moved from a closed position to an opened position, so that the door is positioned below and adjacent to the rearward tail portion.

BRIEF DESCRIPTION OF THE DRAWINGS

Embodiments of the invention will now be described, by way of example only, with reference to the accompanying drawings in which corresponding reference symbols indicate corresponding parts, and in which.

DETAILED DESCRIPTION OF THE INVENTION

Figure 1:
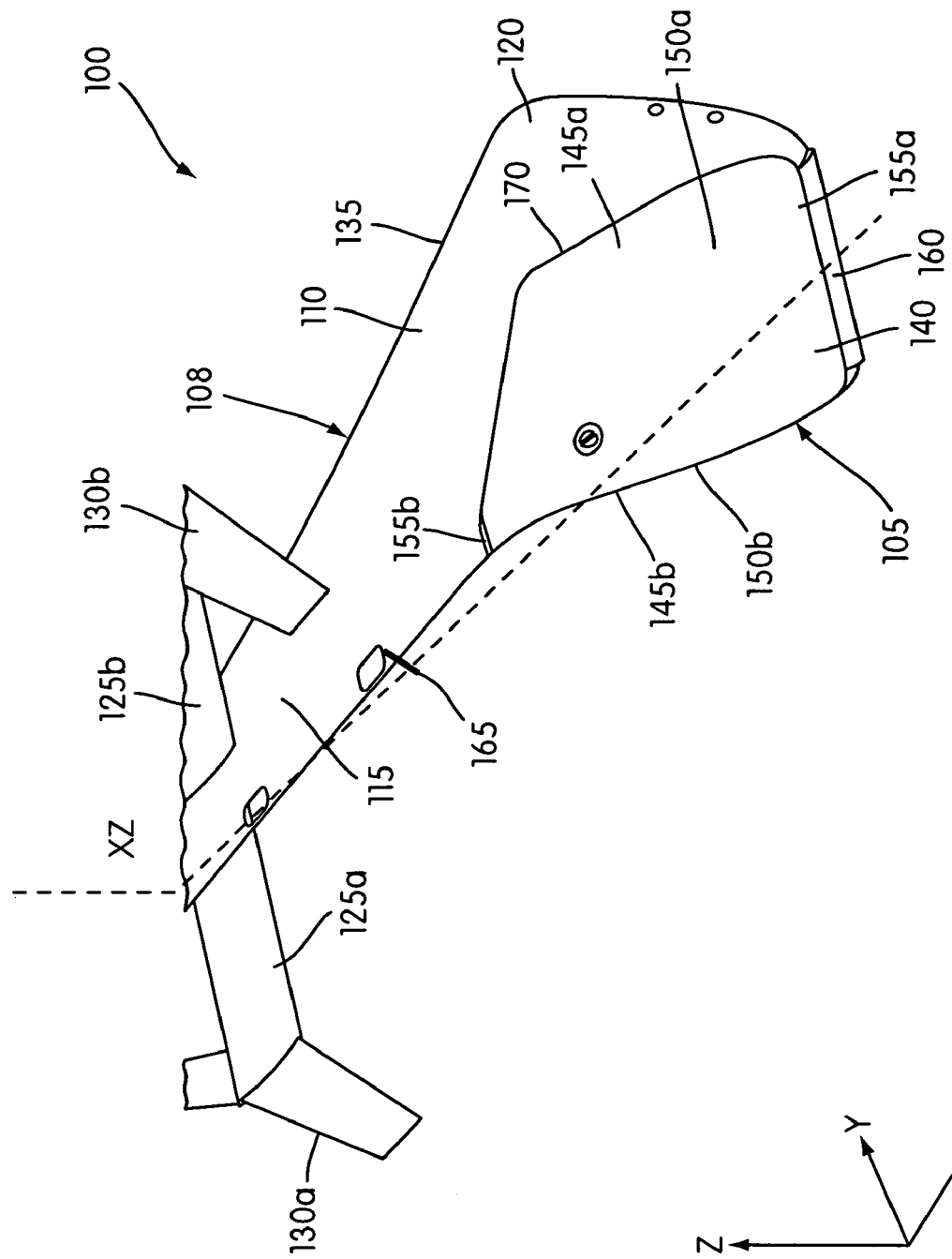
FIG. 1 is a schematic representation of a rear portion of a helicopter that includes a swing door in accordance with an embodiment of the invention.

FIG. 1 is a schematic representation of a helicopter, generally shown as 100, including a door 105 which embodies the principles of the present invention. The helicopter 100 comprises a body 108, including a fuselage 110 that comprises a rearward tail portion 115 and a central skeleton 120. The rearward tail portion 115 includes a pair of generally horizontal stabilizers 125a, 125b that are each provided at one end thereof with a generally vertical fin 130a, 130b. The rearward tail portion 115 may also include a variable pitch antitorque rotor (not shown in FIG. 1) to compensate for the torque created by the main single rotor (not shown in FIG. 1) located on a top portion 135 of the central skeleton 120.

Door 105, which is shown in FIG. 1 in a closed and latched position with respect to the main body 108, has a substantially concave interior and convex exterior shape. Door 105 generally includes a central portion 140 that tapers from wide to narrow from a first base portion 155a, which contacts the bottom portion 160 of the central skeleton 120, to a second base portion 155b, which contacts the rearward tail portion 115. As can be seen in FIG. 1, door 105 is substantially symmetric along the central longitudinal symmetry plane XZ that extends along the fuselage 110. Door 105 also includes two substantially triangular side portions 145a, 145b that each extend along the curved end portion 150a, 150b of the central portion 140, from the first base portion 155a to the second base portion 155b. Curved end portion 150a, 150b define the longitudinal contour of the central portion 140.

The door 105 is constructed and arranged such that a seamless transition between the outer skin of the fuselage 110 and the outer skin of the door 105 can be obtained when the door 105 is in a fully closed position. To that effect, an outer edge 170 of the door swing 105 is configured to engage a peripheral frame 215 that extends along a contour 220 of the access opening 205 (see FIG. 2). As best seen in FIG. 3, the door 105 also includes a latch mechanism 320, 325, 330 that is configured to secure the door to the fuselage 110 in a closed or opened position. Specifically, the first latch mechanism 320 is a lock open device that is configured to secure the door 105 in an opened and latched position. The second latch mechanism 325 is configured to secure the door 105 in a closed and latched position. The first and the second latch mechanisms 320, 325 are operated via the control mechanism 330.

In the embodiment shown in FIG. 1, door 105 is a single panel door which has a skin that can be made, for example, by using a stamping or molding process. Door 105 may be made from a variety of materials including metal or carbon/epoxy, the latter being generally selected for their ability to withstand cyclic loading, their relative low weight, and their manufacturing flexibility. In another embodiment, the door 105 may be assembled from several parts that are fastened together using, for example, a welding or riveting process.

Figure 2:
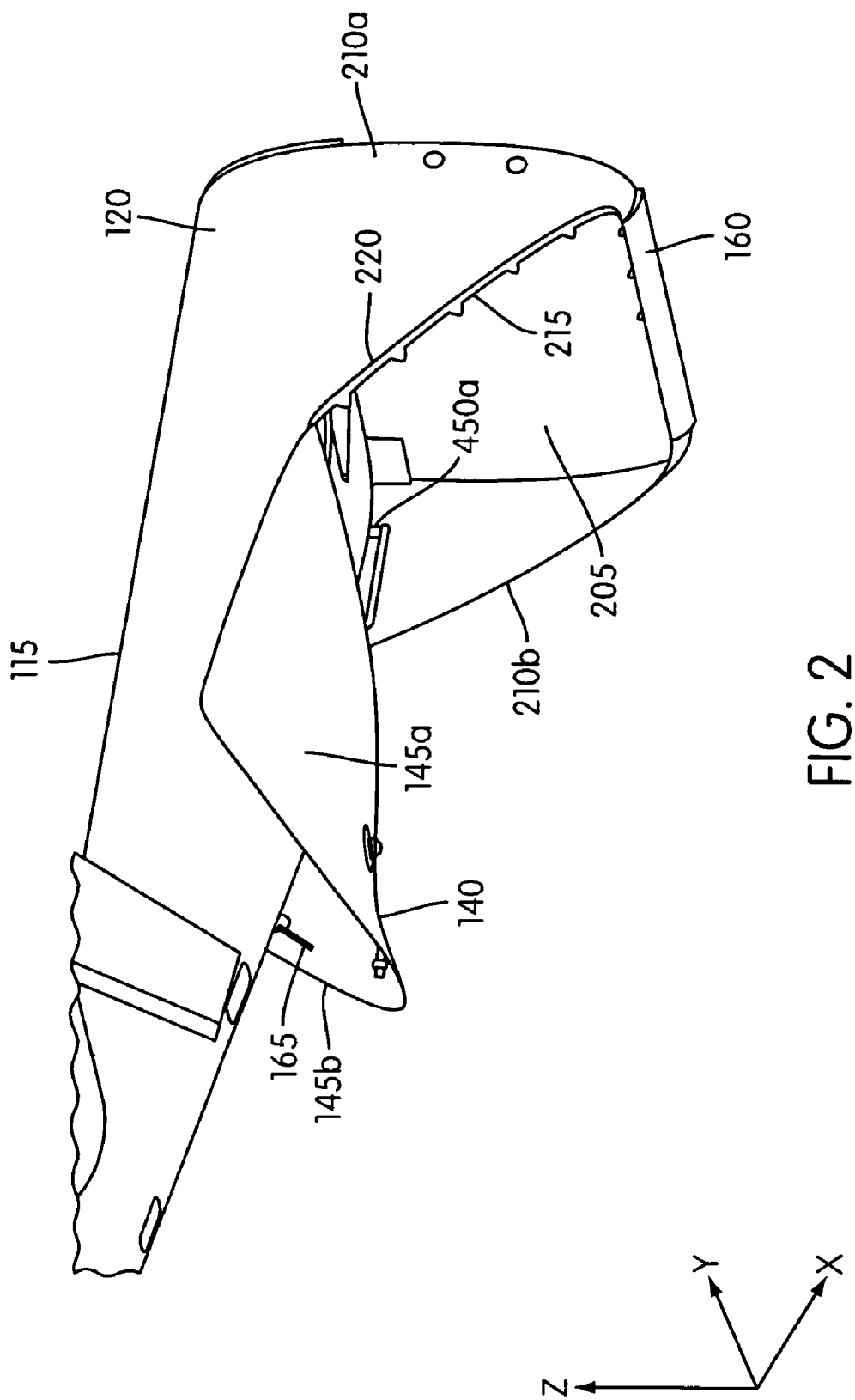
FIG. 2 is a schematic representation of a rear portion of a helicopter that includes a door, in an opened position, in accordance with an embodiment of the invention.
Figure 3:
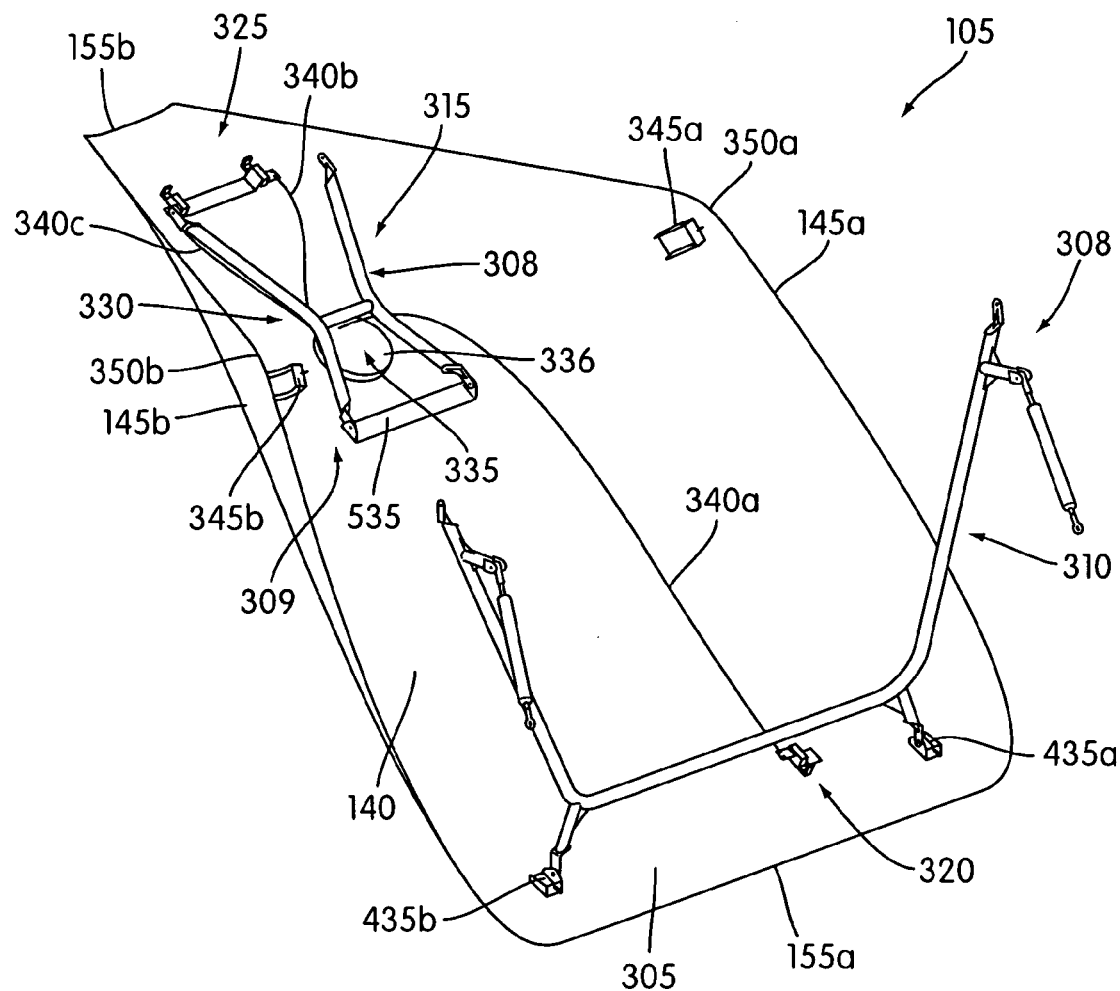
FIG. 3 is a view of a door in accordance with an embodiment of the invention.

Referring now to FIG. 2, this figure shows the door 105 in a fully opened position, in accordance with an embodiment of the invention. The door 105 is tucked around the rearward tail portion 115 to maximize access to opening 205. Specifically, the central portion 140 is disposed generally parallel and slightly below the bottom surface of rearward tail portion 115. The access opening 205 substantially extends, as viewed in the Z-direction, from the bottom portion 160 of the central skeleton 120 to the junction between the rearward tail portion 115 and the central skeleton 120 and, as viewed in the Y-direction, from the first lateral portion 210a to the second lateral portion 210b of the central skeleton 120. Because side portions 145a, 145b and central portion 140 envelope or "nest" with the rearward tail portion 115 in the open position, sufficient room is provided for personnel to maneuver around the rear portion of the helicopter 100 when door 105 is open. In the construction of FIG. 2, antennas 165 mounted to the bottom portion 170 of the rearward tail portion 115 may be protected or shielded when the opening 205 is accessed.

FIG. 3 shows a view of the inner portion 305 of the door 105, in accordance with an embodiment of the invention. The door 105 is connected to the helicopter body 108 via a linkage 308, which includes a first link assembly, generally shown as 310, and a second link assembly, generally shown as 315. A detailed description of the first and second link assemblies 310 and 315 will be provided, later, with reference to FIGS. 4-5.

Figure 10:
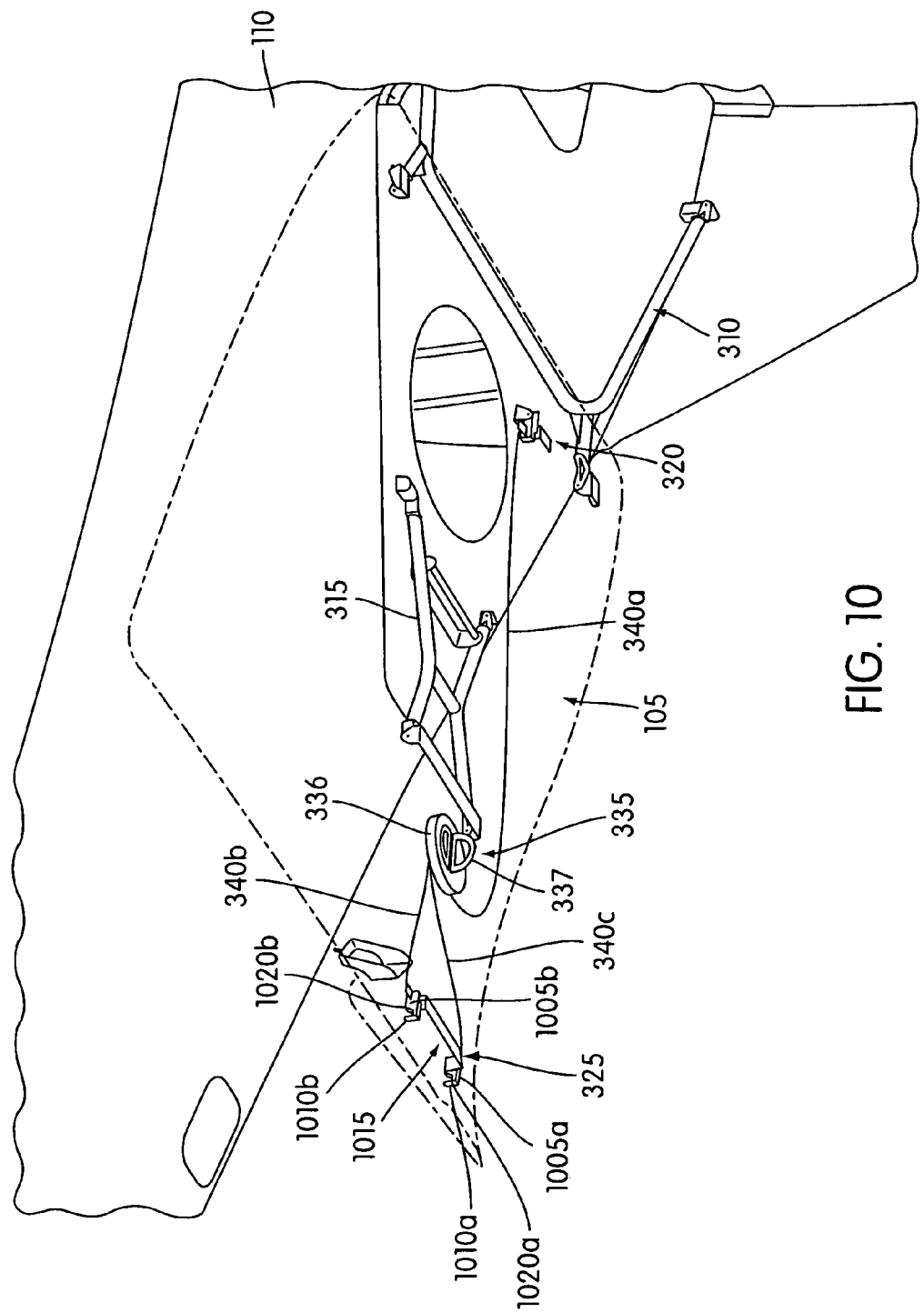
FIG. 10 is a view of the door in a fully opened position in accordance with an embodiment of the invention.

The door 105 also includes a first latch mechanism 320 and a second latch mechanism 325 that are respectively configured to latch the door 105 to the body 108 when the door 105 is in an opened position (see FIG. 2) and in a closed position (see FIG. 1). The first and second latch mechanisms 320 and 325 can be operated via a control mechanism 330 arranged in the central portion 140 of the door 105. The control mechanism 330, shown in this embodiment, essentially includes a handle 335 and three cables 340a, 340b, 340c that connect the handle 335 to the first latch mechanism 320 and the second latch mechanism 325. As shown in FIG. 10, handle 335 includes a main body 336 that has a substantially disc shape, and a retractable portion 337 that can be rotated in order to control the first and second mechanisms 320, 325. Operation of the control mechanism will be described later with reference to FIGS. 10-14.

The door 105 also includes a pair of members 345a, 345b, that are provided proximate apex portions 350a, 350b of the side portions 145a, 145b. Members 345a, 345b, are constructed and arranged to secure the door 105 to the body 108 of the helicopter 100, when it is in a closed and latched position. These members 345a, 345b may be conventional securement members as known in the art.

Figure 4:
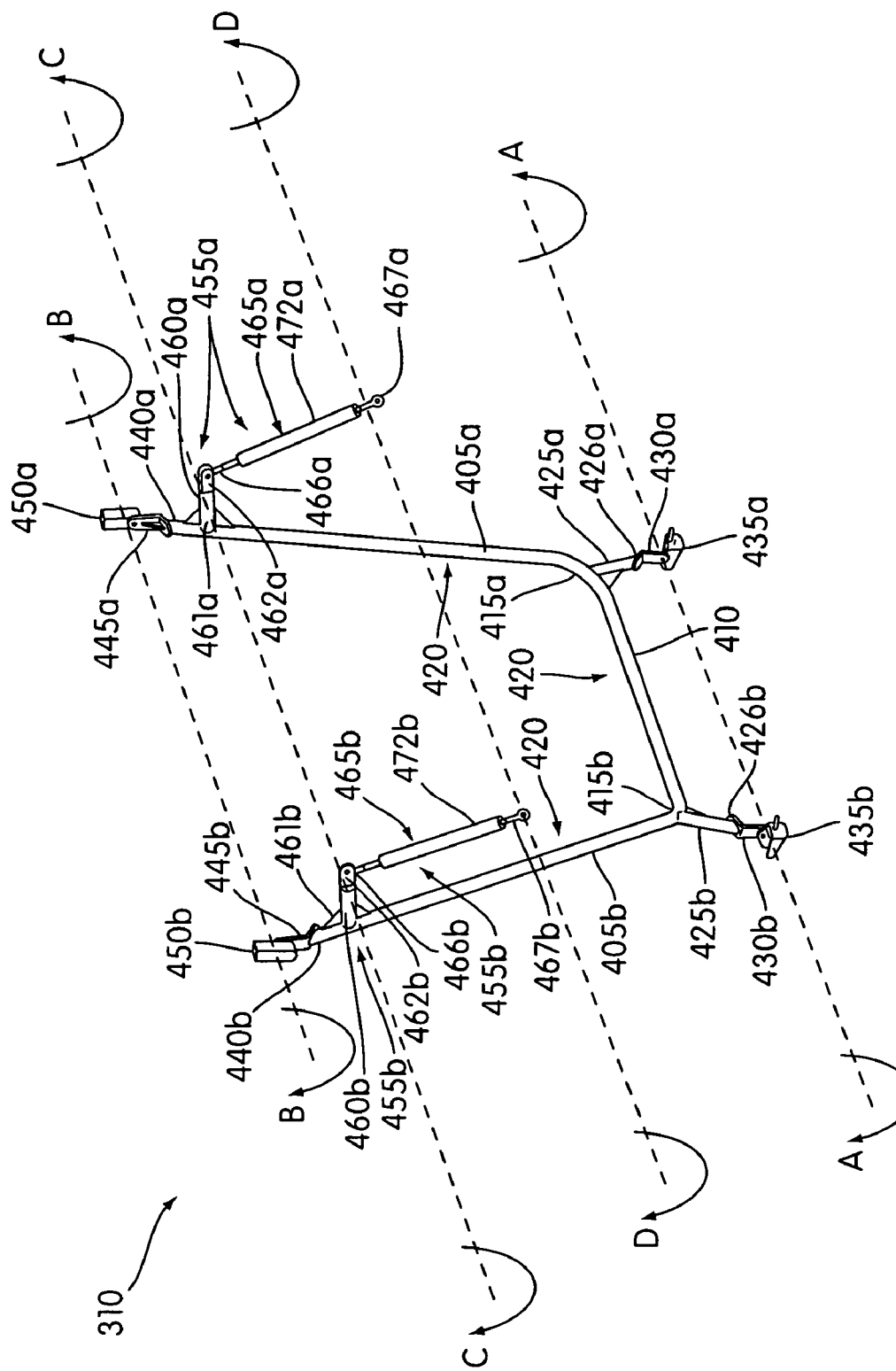
FIG. 4 is a view of a first link assembly that connects the door to the fuselage of the helicopter in accordance with an embodiment of the invention.

Referring now to FIG. 4, as a non-limiting example, the first link assembly 310 has a generally U-shaped bar 420. The U-shaped bar 420 includes a first elongated portion 405a and a second elongated portion 405b that are connected via a cross portion 410. In this embodiment, the first, second and cross portions 405a, 405b, 410 constitute a single continuous bar 420 that is bent at locations 415a, 415b. However, it will be appreciated that the first, second and cross portions 405a, 405b, 410 may also be separate parts that are assembled using known techniques (e.g., soldering) to form the U-shaped configuration of bar 420. The first link assembly 310 also includes a first and second mounting rods 425a, 425b that are respectively connected to the U-shaped bar 420 at corner or bent locations 415a, 415b. In addition, first and second connecting portions 430a, 430b are arranged proximate end portions 426a, 426b of the first and second mounting rods 425a, 425b. First and second connecting portions 430a, 430b are pivotally connected to the door hinges 435a, 435b, which are each arranged on the inner portion 305, and proximate the first base portion 155a, of the door 105 (see FIG. 3). In an embodiment, door hinges 435a, 435b each include a locator pin (not shown in FIG. 3) and are configured to lock the door 105 in a closed position. In this arrangement, the first link assembly 310 can rotate about axis AA.

Figure 6:
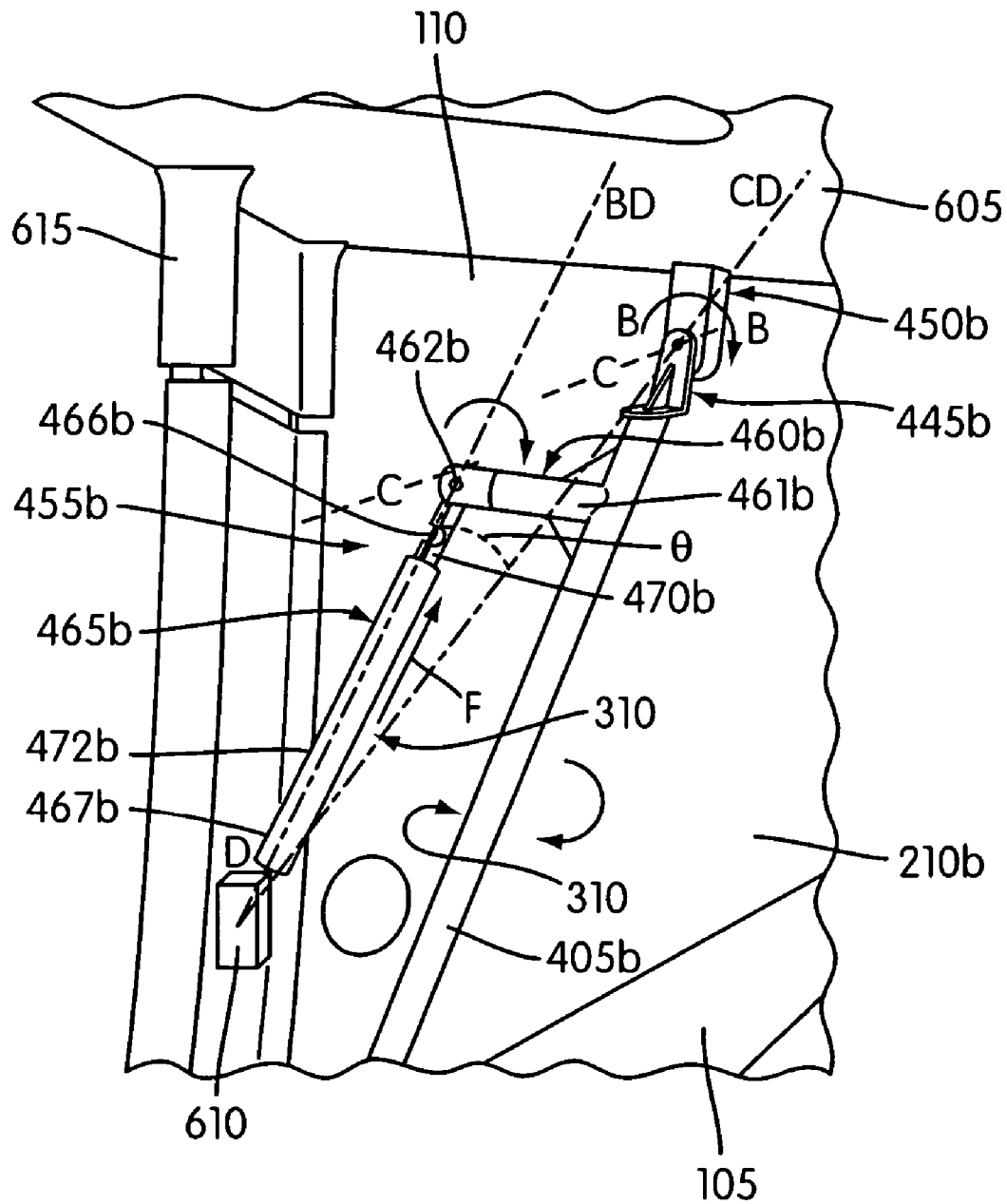
FIG. 6 is a view of the first link assembly attached to the fuselage of a helicopter in accordance with an embodiment of the invention.

The first and second elongated portions 405a, 405b of the first link assembly 310 include a first and a second distal end portion 440a, 440b that are provided with first and second connecting elements 445a, 445b, respectively. The first and second connecting elements 445a, 445b are respectively pivotally connected to a fuselage hinge 450a, 450b, so that the first link assembly 310 can rotate about axis BB. As best seen in FIG. 6, fuselage hinges 450a, 450b are mounted to the interior of the fuselage 110.

In the construction shown in FIG. 4, the connection between the first link assembly 310 and the fuselage 110 is also made via a first and a second retractable connecting portions 455a, 455b. As can be better appreciated from FIG. 6, each retractable connecting portion 455a, 455b (only retractable connecting portion 455b being shown in FIG. 6) includes an arm 460a, 460b, and a respective gas strut 465a, 465b. Arms 460a, 460b include respective first end portions 461a, 461b, which are respectively connected to the first and the second elongated portion 405a, 405b, and second end portions 462a, 462b, that are pivotally connected to first end portions 466a, 466b of the gas struts 465a, 465b. Gas struts 465a, 465b, further include second end portions 467a, 467b that are each pivotally connected to the fuselage 110 of the helicopter 100. In this embodiment, gas struts 465a, 465b can rotate about axis CC and DD, as shown in FIG. 4.

In the embodiment shown, strut rods 470a, 470b are connected to respective arms 460a, 460b, while the strut cylinders 472a, 472b are connected to respective portions of the fuselage 110 (only strut rod 470b, strut cylinder 472b and arm 460b are shown in FIG. 6). It should be appreciated, however, that the struts can be reversed in orientation so that the rods are connected to the fuselage and cylinders are connected to the arms.

Figure 5:
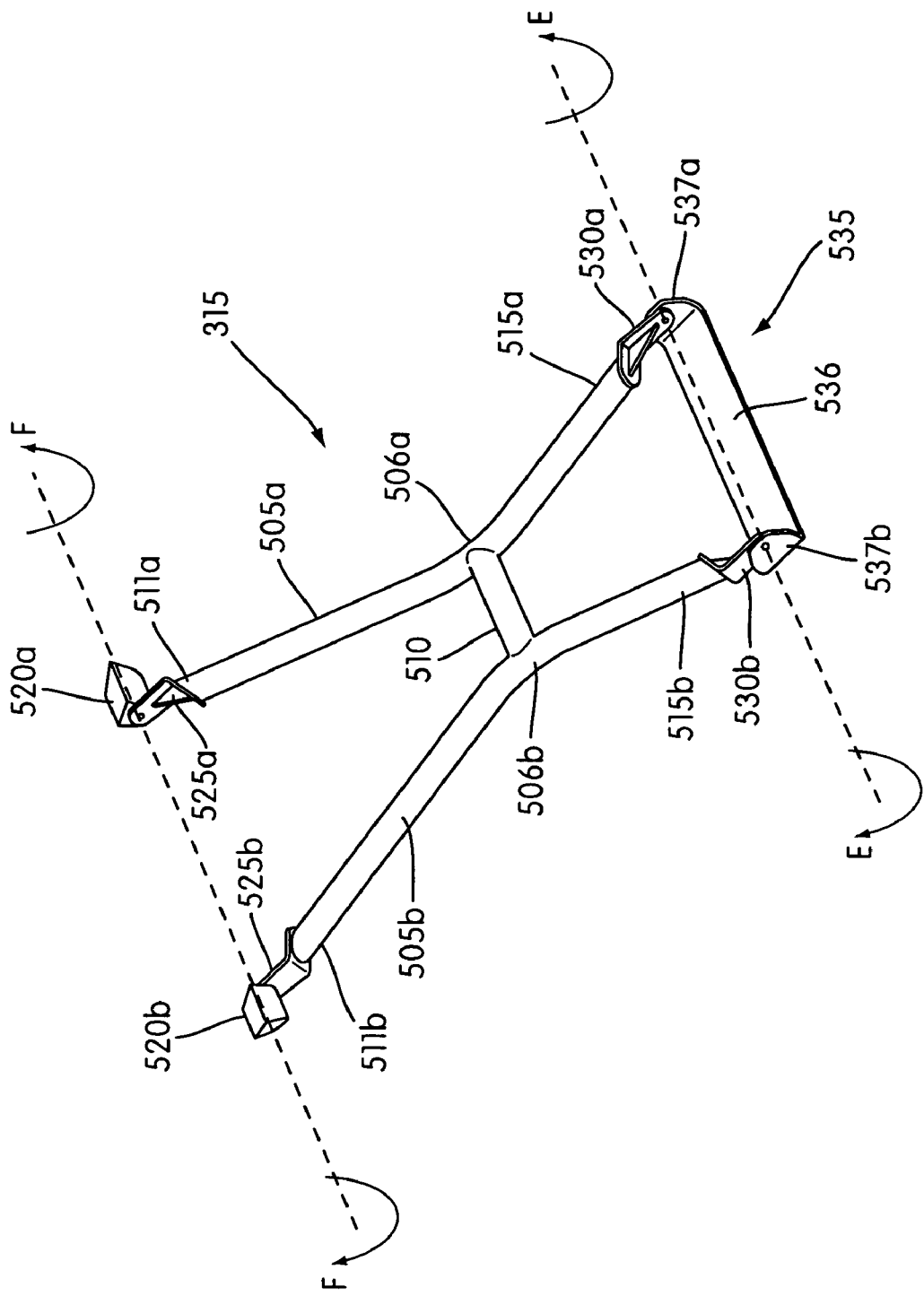
FIG. 5 is a view of a second link assembly that connects the door to the fuselage of the helicopter in accordance with an embodiment of the invention.
Figure 13:
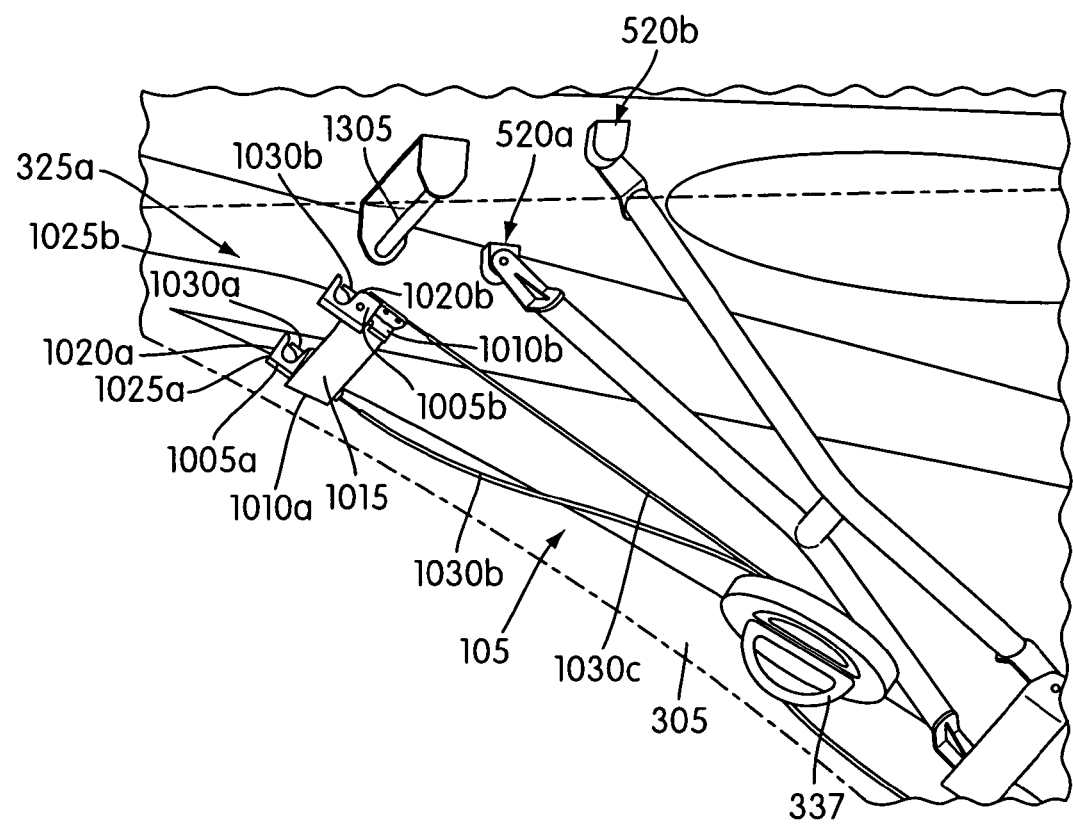
FIG. 13 is a view of the second latch mechanism mounted to the door in accordance with an embodiment of the invention.
Figure 14:
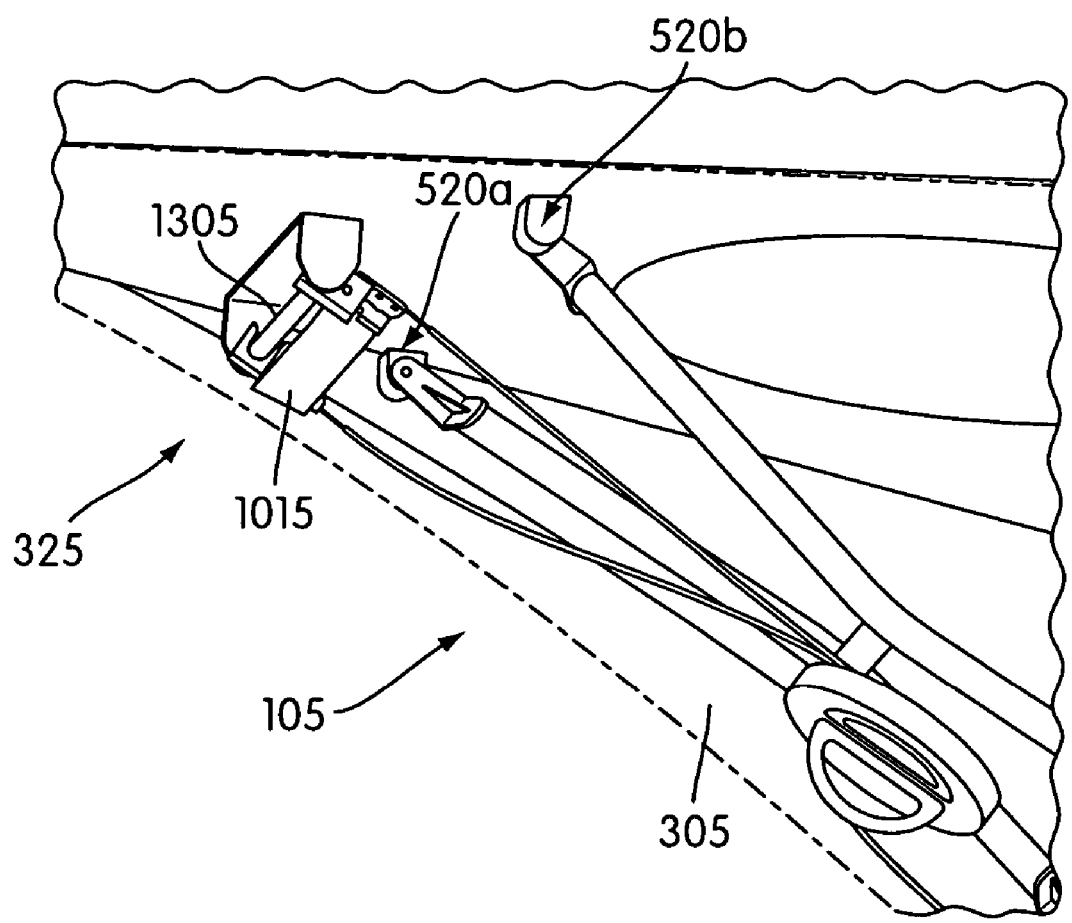
FIG. 14 is a view of the second latch mechanism when the door is in a closed position in accordance with an embodiment of the invention.

FIG. 5 shows a construction of the second link assembly 315 that connects the door 105 to the fuselage 110, in accordance with an embodiment of the invention. Second link assembly 315 has a generally H-shape and includes a first arm 505a and a second arm 505b that are connected via an intermediate portion 510 at locations 506a, 506b. Each arm 505a, 505b includes a first distal end portion 511a, 511b, and a second distal end portion 515a, 515b. First and second arms 505a, 505b are respectively pivotally connected to tail portion hinges 520a, 520b, via first connecting elements 525a, 525b, which are mounted to first end portions 511a, 511b. As shown in FIGS. 13-14, tail portion hinges 520a, 520b are positioned in the interior of the rearward tail portion 115.

In this embodiment, first and second arms 505a, 505b are pivotally connected to the door 105 via second connecting elements 530a, 530b, which are mounted to the second end portions 515a, 515b. Attachment of the second link assembly 315 to the door 105 is performed via plate 535, which is affixed (e.g., by fasteners or by being welded) to the inner portion 305 of the door 105 (see FIGS. 13-14). Plate 535 includes a central portion 536 and two distal end portions 537a, 537b, that extend substantially perpendicular with respect to the central portion 536. Distal end portions 537a, 537b are configured to receive second connecting elements 530a, 530b, as shown in FIG. 5. In the construction of FIG. 5, the second link assembly 315 is configured to rotate about axis EE and FF.

As best seen in FIG. 3, plate 535 is dimensioned to be mounted to the central portion 140 of the door 105 at an intermediate position 309 between the first base portion 155a and the second base portion 155b.

FIG. 6 shows an embodiment of the first link assembly 310 mounted to the fuselage 110, when the door 105 is in a closed and latched position. The fuselage hinge 450b extends downwardly from an upper frame 605 of the fuselage 110 and contacts the second lateral portion 210b of the fuselage 110. The second connecting element 445b is pivotally connected to the fuselage hinges 450b at one end thereof. Similarly, the second end portion 467b of the gas strut 465b is pivotally connected to a lateral hinge 610, which is arranged on a lateral frame 615.

Figure 7:
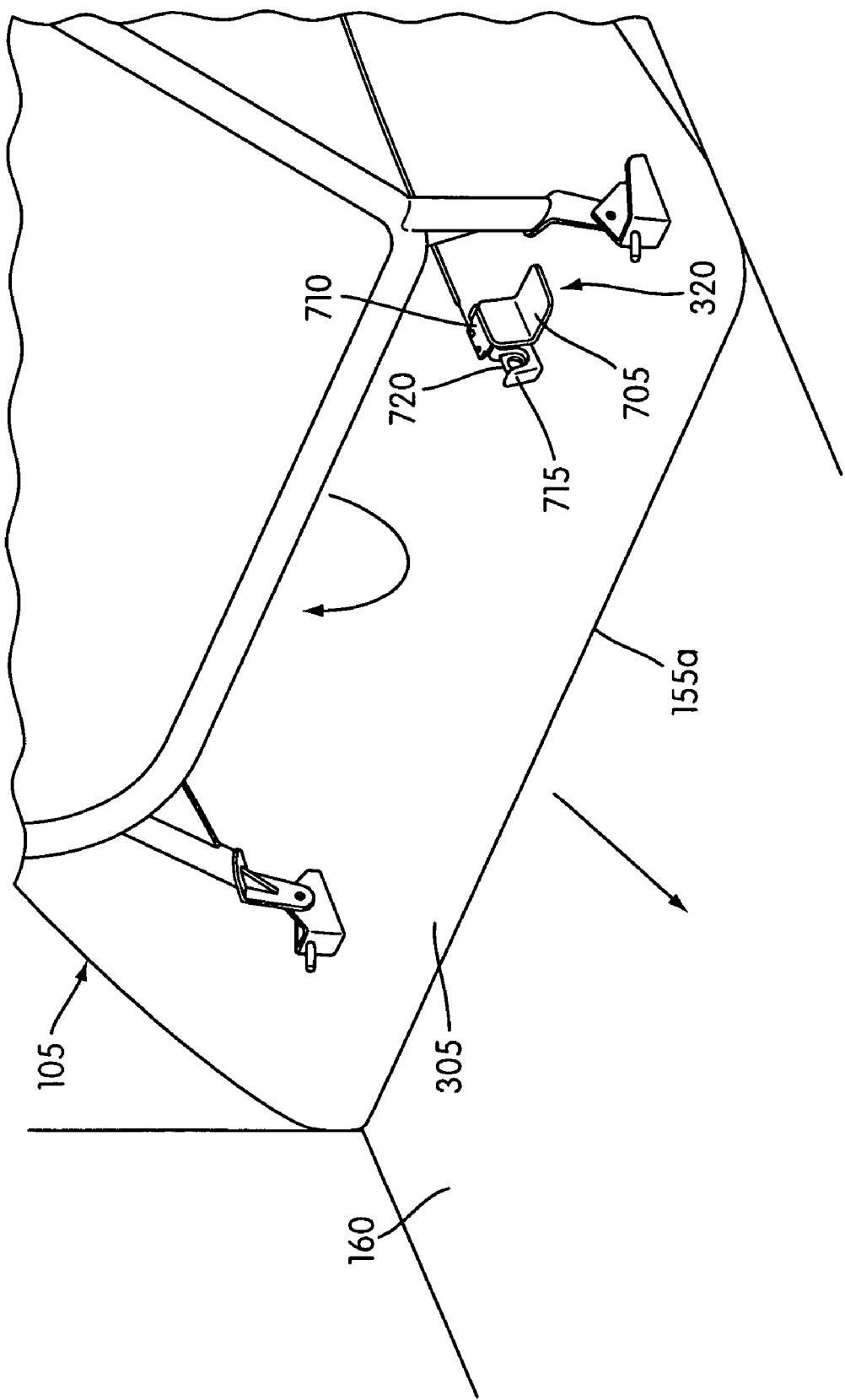
FIG. 7 shows a portion of the door in accordance with an embodiment of the invention.
Figure 8:
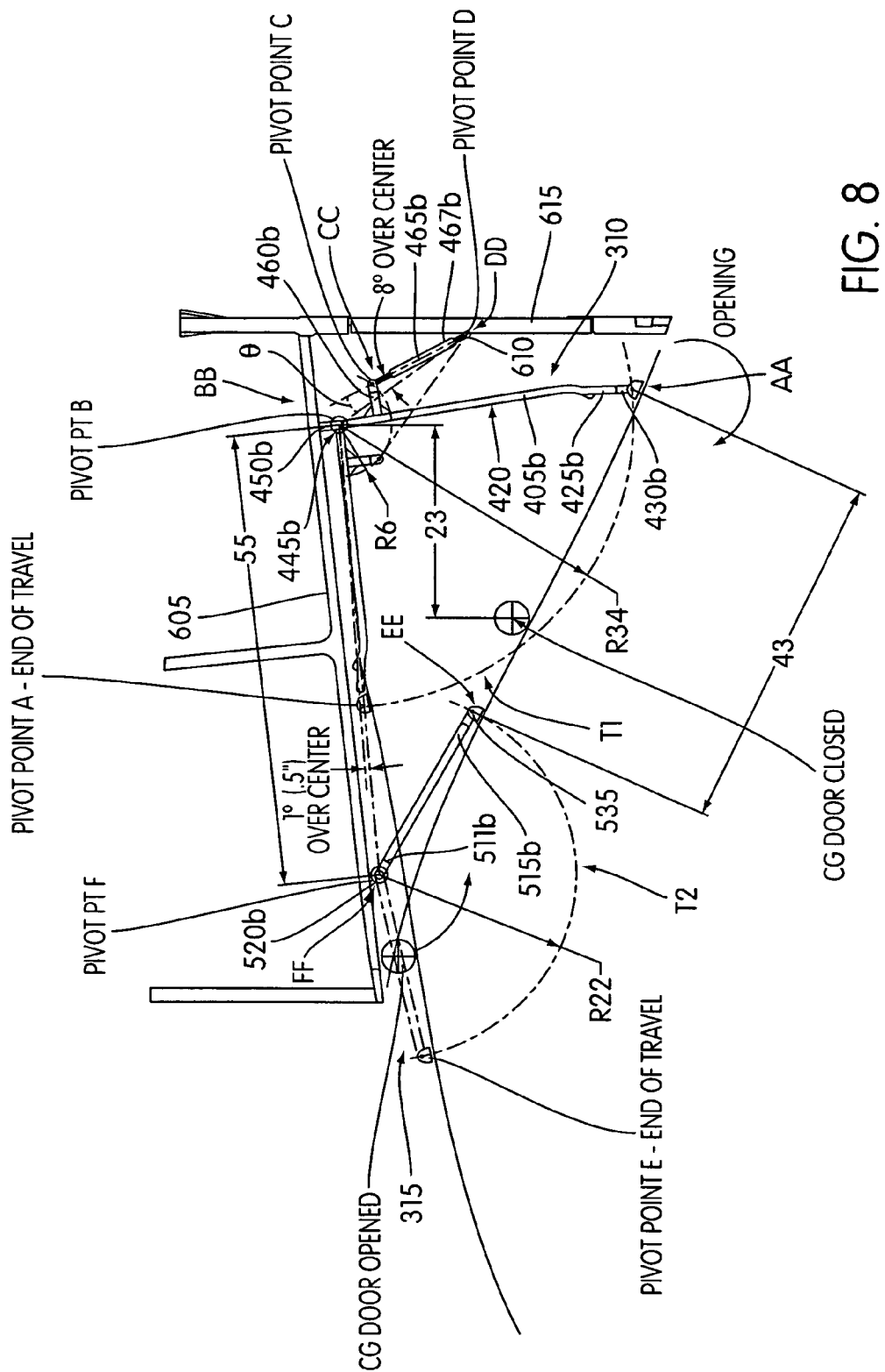
FIG. 8 shows a schematic representation of the motion of the first and second assembly when the door is moved from a closed position (straight line) to an opened position (dashed line)

Operation of the door 105 will now be explained with reference to FIGS. 6-8 and 9a-f. FIG. 7 shows the lower portion of the door 105 when the door 105 is in a closed position. FIG. 8 shows a schematic representation of the motion of the first and second assemblies 310 and 315 when the door 105 is moved from a closed position (straight line) to a fully opened position (dashed line). FIGS. 9a-f show a door opening sequence.

As can be seen in FIG. 8, the first and second assemblies 310 and 315 are respectively pivotally connected to the upper frame 605 with fuselage hinge 450b and rearward tail portion hinge 520b. First assembly 310 is also pivotally connected to the lateral frame 615 via lateral hinge 610. FIG. 8 shows the various rotation axis (AA, BB, CC, DD, EE, and FF) about which the first and second assemblies 310, 315 can rotate. These axis of rotation are perpendicular to the plane of FIG. 8. Specifically, during opening and closing of the door 105, the second elongated portion 405b of the U-shaped bar 420 rotates about pivot point B, the second connecting portion 430b of the second mounting rod 425b rotates about pivot point A, and the second end portion 467b of the gas strut 465b rotates about pivot point D. In addition, during opening and closing of the door 105, the first distal end portion 511b rotates about pivot point F and the second distal end portion 515b rotates about pivot point F. To avoid redundancy, the discussion herein will focus on the motion of only one side of the first and second assemblies 310, 315, since the motion of the other side of these assemblies is substantially identical.

Figure 9A:
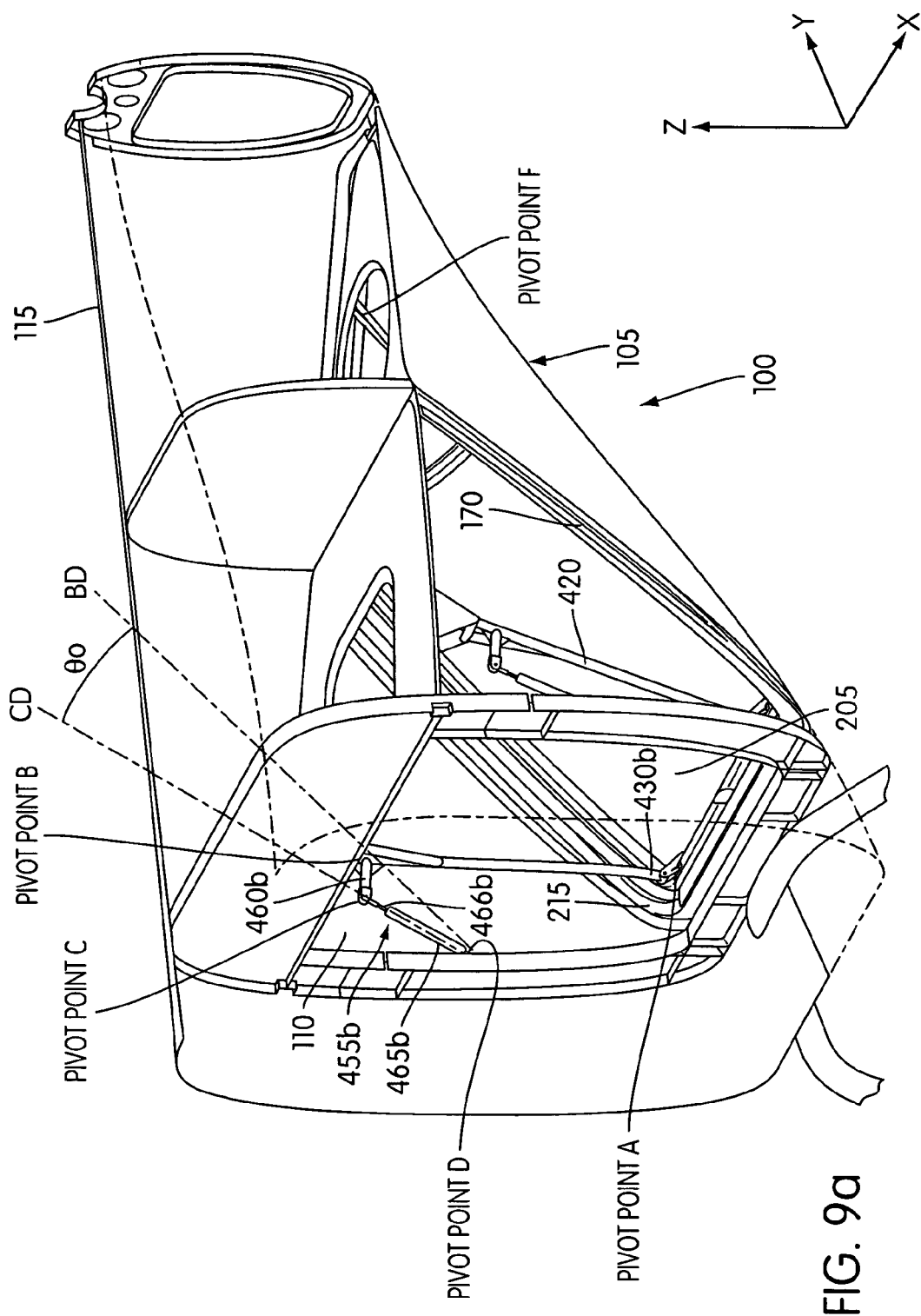
FIGS. 9a-f show several views of the door when it is moved from a closed position to an opened position.

As shown in FIG. 9a, when the door 105 is in a closed position, the outer edge 170 of the door 105 engages the peripheral frame 215 of the access opening 205 so that the outer skin of the door 105 extends flush with the skin of the fuselage 110. In the closed position, the center of gravity CG of the door 105 is located between pivot point B and pivot point F, as shown in FIG. 8. Furthermore, in the closed position, the longitudinal direction of the gas strut 465b, which extends between pivot point C and pivot point D (line CD), defines an angle $\theta=\theta o$ (>0) with the fixed line BD that extends between pivot point B and pivot point D (see FIGS. 6 and 8). In an embodiment, the angle may be about 8°.

When the door 105 is unlatched, the opening 205 may be accessed by moving the door 105 generally rearwardly and upwardly, as shown in FIGS. 9b-f. FIG. 8 schematically shows the trajectories followed by pivot point A (identified as "T1" in FIG. 8) and pivot point E (identified as "T2" in FIG. 8), when the door 105 is brought from the closed position (see FIG. 9a) to the opened position (see FIG. 9f).

Opening of the door 105 causes the U-shaped bar 420 to rotate in a clockwise direction (as seen in FIG. 8), which, in turn, forces the arm 460b of the retractable portion 455b to pivot about pivot point C. Rotation of the arm 460b compresses the gas strut 465b and causes the latter to rotate about pivot points C and D, respectively. In this embodiment, the gas strut 465b rotates in a counter-clockwise direction (as seen in FIG. 8).

Figure 9B:
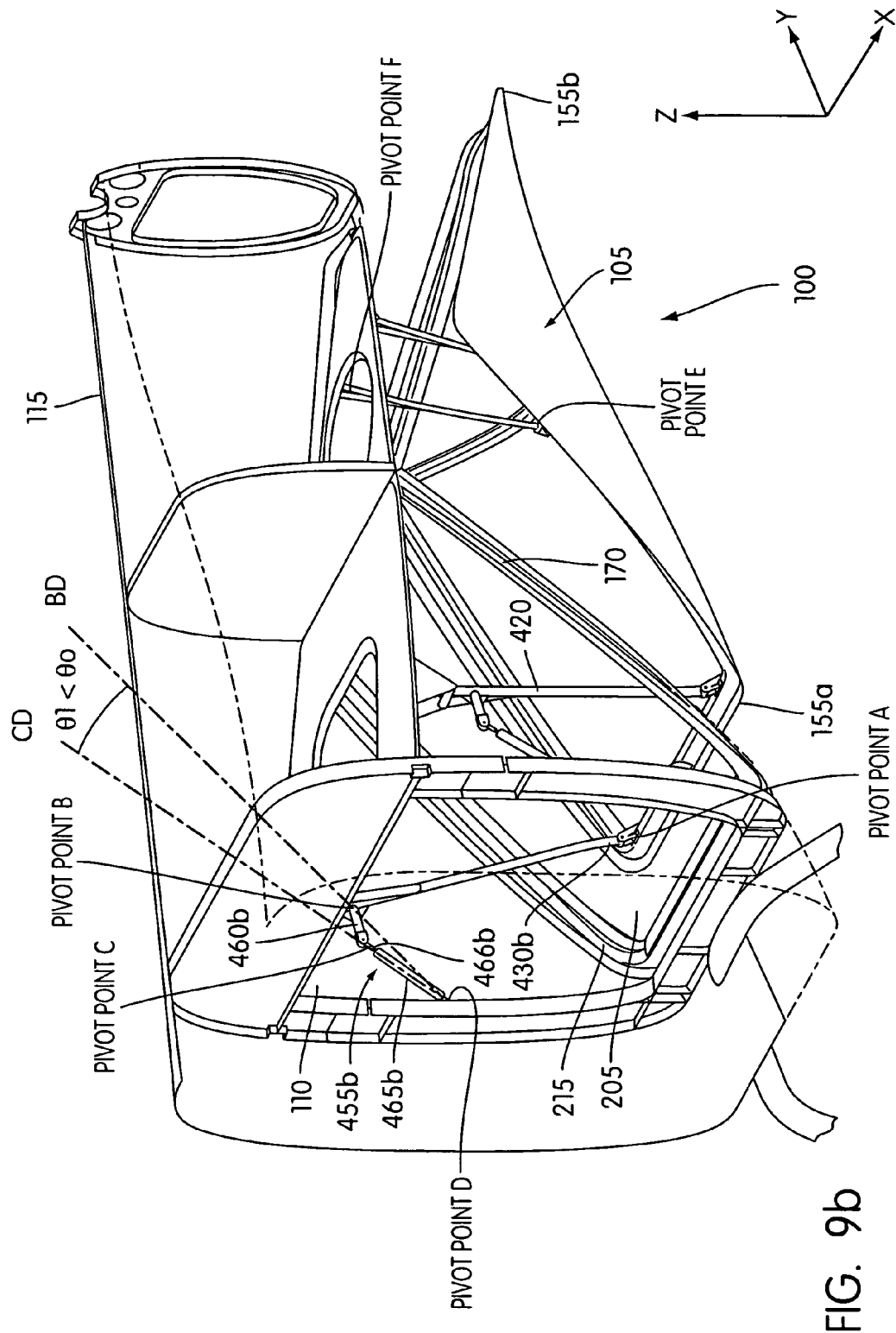

FIG. 9b shows the door 105 shortly after being unlatched and moved from its closed position. The gas strut 465b is in a compression state with respect to its initial condition, i.e., its condition when the door 105 is closed ($\theta=\theta o$). As can be seen in FIG. 9b, the longitudinal direction of the gas strut 465b, which extends between pivot point C and pivot point D, defines an angle $\theta=\theta 1$, with the line BD. Angle $\theta 1$ is smaller than $\theta o$.

In order to counterbalance its compression state, the gas strut 465b exerts a reaction force F along its longitudinal direction (i.e., direction between pivot points D and C) which, when transmitted to its first end portion 466b, causes the arm 460b and the second connecting element 445b to pivot, respectively, about pivot points C and B, as best seen in FIG. 6. Rotation of the arm 460b is transmitted to the second elongated portion 405b, which, in turn, forces the door 105 towards its closed position. In an embodiment shown in FIG. 7, rotation of the second elongated portion 405b causes the first base portion 155a of the door 105 to re-engage the bottom portion 160 of the central skeleton 120.

Figure 9C:
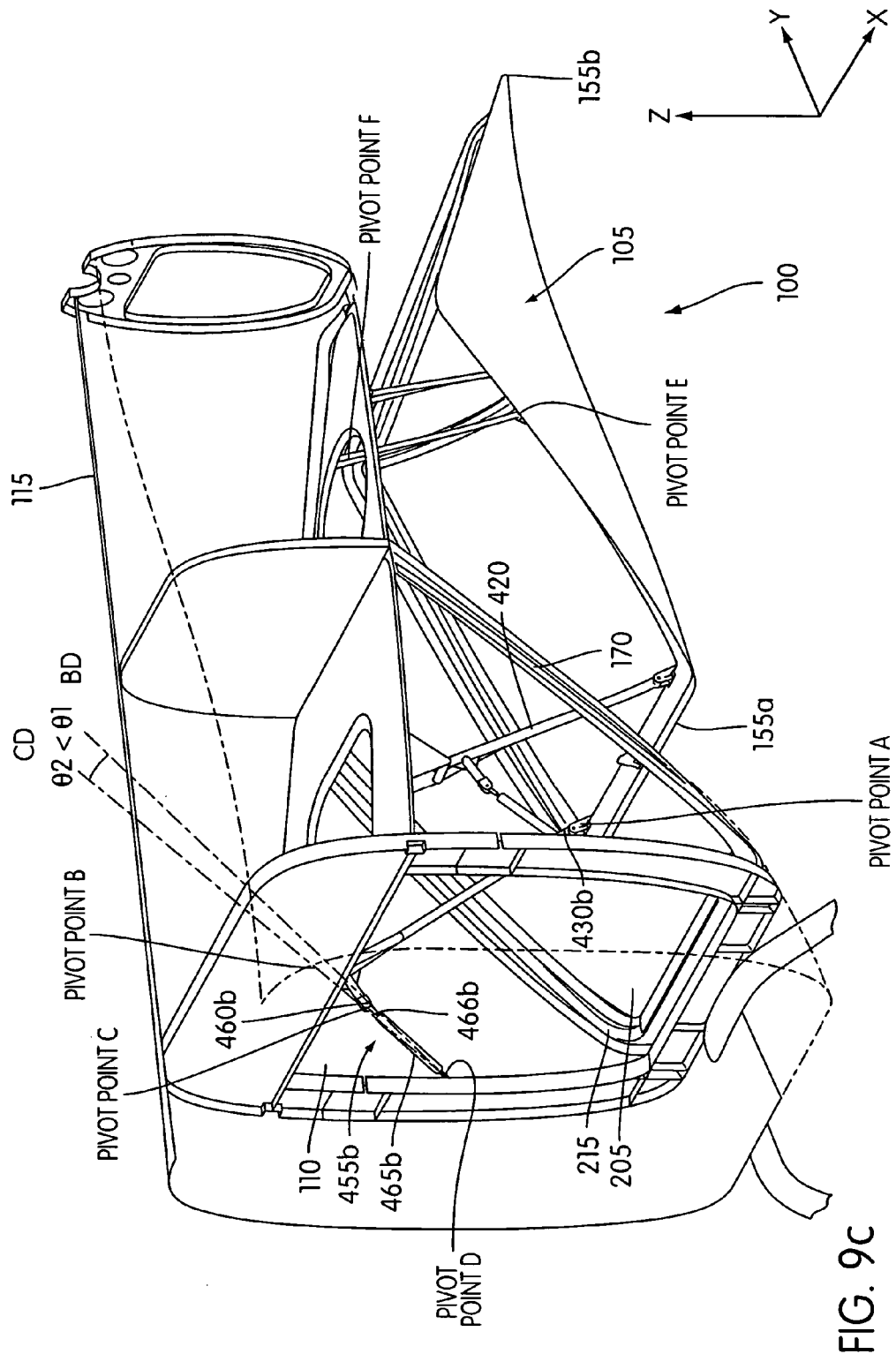

When the manual force exerted to rotate the first assembly 310 about the pivot point B in a clockwise direction (door opens) continues to be greater than the reaction force exerted by the gas strut 465b, the opening of the door 105 is continued. FIG. 9c shows the door 105 in a further opened position. In FIG. 9c, the gas strut 465b is further compressed from its already compressed condition of FIG. 9b and the longitudinal direction of the gas strut 465b that extends between pivot points C and D defines now an angle θ=θ02 with the line that extends between pivot points B and D (line BD). In this condition, angle θ2 is smaller than angle θ1. In FIG. 9c, angle θ2 is substantially zero.

The compression state of the gas strut 465b is maximum when the direction CD coincides with line BD, i.e., when the longitudinal axis of the gas strut 465b coincides with the longitudinal axis of the arm 460b. This configuration, in which angle θ=0, corresponds to an intermediate position between that shown in FIG. 9c and that shown in FIG. 9d. Once the longitudinal direction of the gas strut 465b passes the line BD, the gas strut 465b is not further compressed and the reaction force F exerted by the gas strut 465b forces the first link assembly 310 to rotate in the clockwise direction. In this configuration, the gas strut 465b cooperates with the force applied to open the door 105.

The assembly formed by arm 460b and gas strut 465b may be referred to as an over-center type assembly due to the fact that the force exerted by gas strut 465b opposes or facilitates the opening of the door 105 depending on its angular position with respect to a center position represented by the fixed line BD. The fixed line BD extends between pivot point B and pivot point D. Specifically, when the longitudinal direction of gas strut 465b rotates between its initial position (in which door 105 is in a closed position) and the fixed line CD, the reaction force exerted by gas strut 465b opposes the opening of the door 105. By contrast, when the longitudinal direction of gas strut 465b passes the fixed line BD, the rotation of the first assembly 310 does not further compress gas strut 465b, and gas strut 465b is geometric orientation that tends to bias the door 105 in the opening direction. As a result, the reaction force exerted by gas strut 465b takes over the opening of the door 105.

Figure 9D:
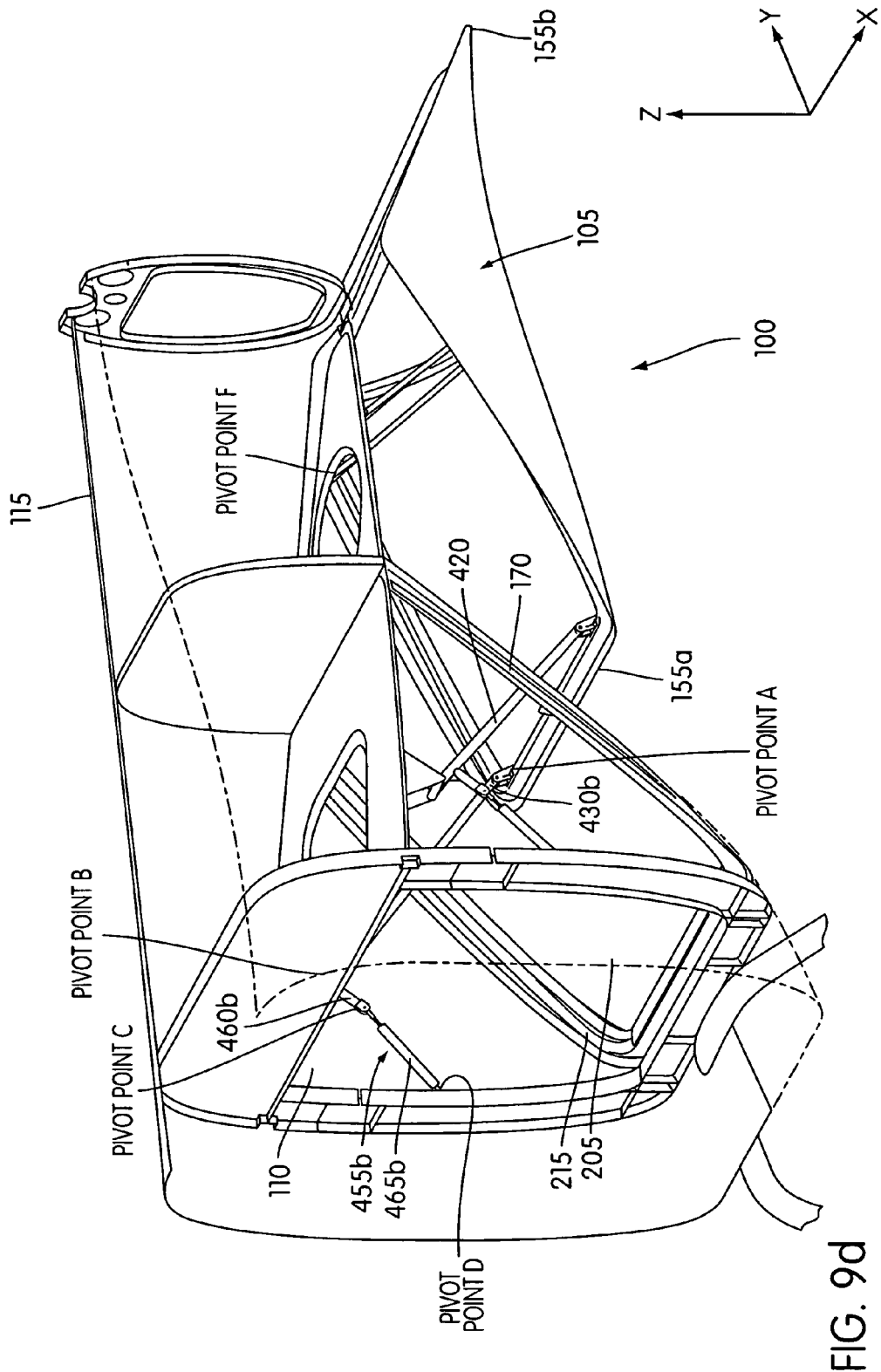

As can be seen in FIG. 9d, the longitudinal direction CD of the gas strut 465b that extends between pivot points C and D is below the center line BD. In this configuration, the compression of the gas strut 465b is less than the compression obtained when the longitudinal direction of the gas strut 465b coincides with the longitudinal direction of the arm 460.

Figure 9E:
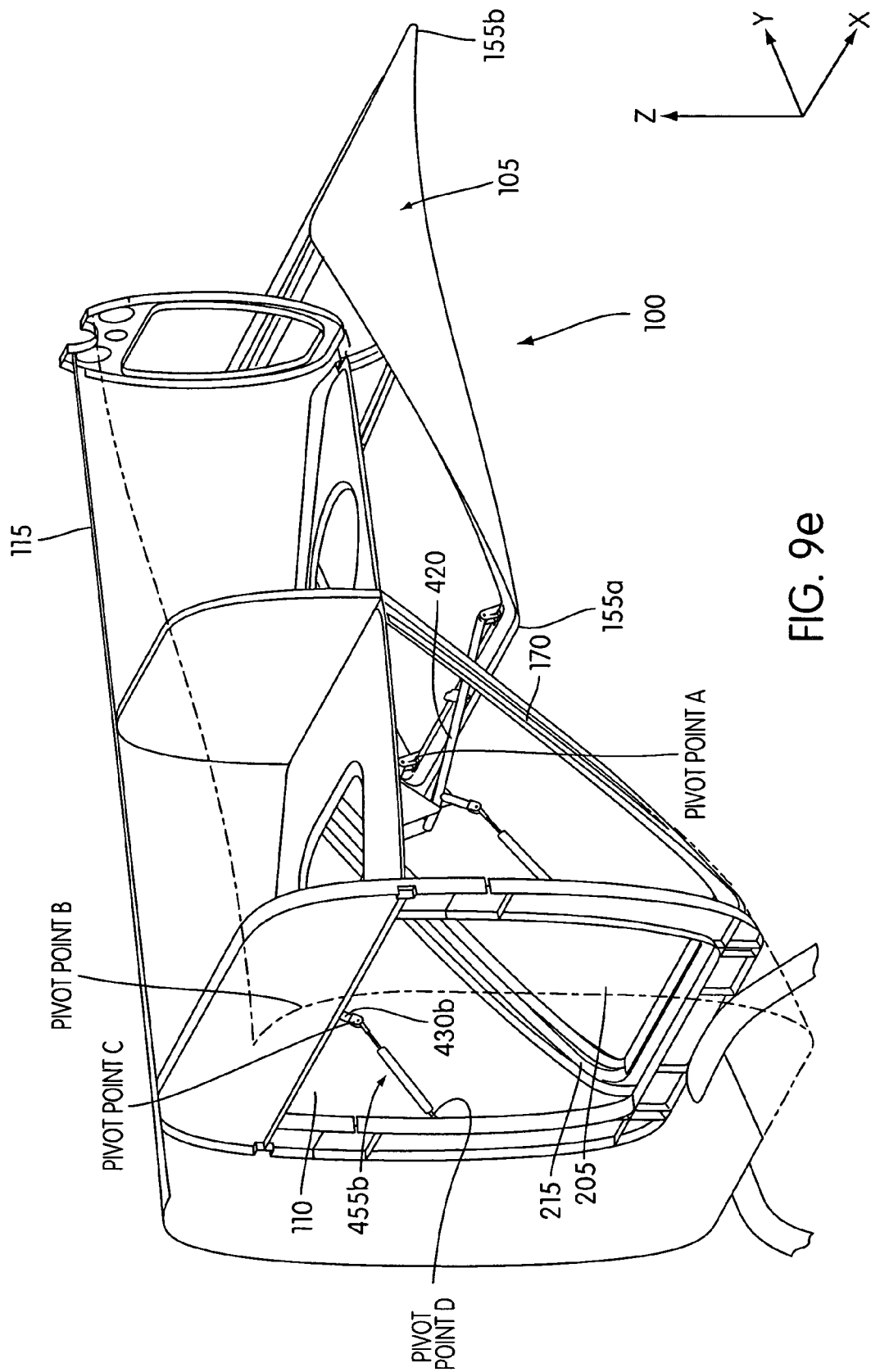

As can be seen in FIGS. 9c-d, rotation of the first and second link assemblies 310 and 315 causes the door 105 to move further rearwardly and upwardly. Specifically, as the door 105 opens, the first and the second base portions 155a and 155b of the door 105 move both vertically and horizontally in the Z and Y directions. As can be seen in FIGS. 9d-e, the second base portion 155b of the door 105 moves downwardly while the first base portion of the door 105 moves upwardly.

FIG. 9e shows the door 105 in a further opened position. In that position, the second base portion 155b is at a lower vertical position (as measured in the Z-direction) than in FIG. 9d while the first base portion 155a is at a higher vertical position.

Figure 9F:
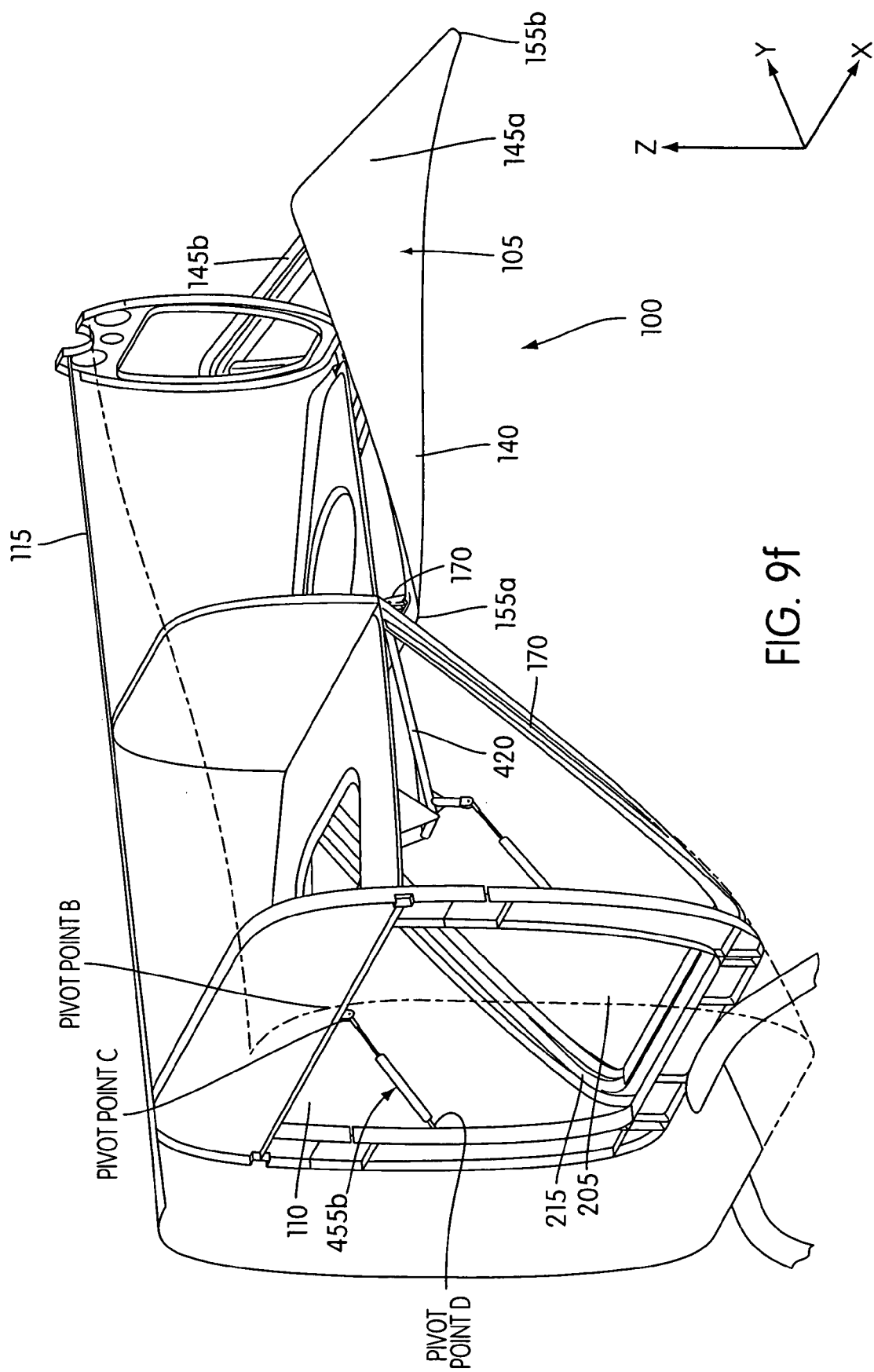

FIG. 9f shows the door 105 when it reaches the end of its travel. In that position, the door 105 is tucked around the rearward tail portion 115 of the helicopter 100, and the central portion 140 and the triangular side portions 145a, 145b of the door envelope the rearward tail portion 115.

Referring to FIG. 8, when the door 105 reaches the end of its travel, the pivot point A of the first link assembly 310 passes over the line that extends between pivot point F and pivot point B (line FB). Because the center of gravity CG of the door 105 is now located aft of the pivot point B (see FIG. 8), the gravity forces the door 105 to move in a counter clockwise direction, thereby pushing the first base portion 155a further upwardly (Z direction). The first latch mechanism 320 located on the first base portion 155a of the door 105 then moves toward the bottom portion 170 of the rearward tail portion 115 (see FIG. 11) and engages the member 1105 arranged on the rearward tail portion 115 (see FIG. 12). The door 105 is now in an opened and latched position.

Depending on the angular position of the longitudinal direction of the first link assembly 310 (line BA) with respect to the fixed line BF, the door 105 can either remain open or move to a closed position. Specifically, when the line BA passes above the fixed line BF, the gravity forces the first link assembly 310 to rotate in a clockwise direction, thus forcing the door 105 to remain open. The door 105 is in geometry lock position since the gravity forces the line BA to remain above the fixed line BF. In other words, the gravity forces the door 105 to remain open. FIG. 8 shows the pivot point A above the line BF when the door 105 reaches the end of its travel. By contrast, when the line BA is below the fixed line BA, the gravity forces the first link assembly 310 to rotate in a counter clockwise direction, thus forcing the door 105 to close.

In order to close the door 105, the process is reversed. First, the first mechanism 320 is unlatched and the second base portion 155b of the door 105 is moved upwardly so as to unlock the door 105. Specifically, this upward motion moves the first base portion 155a downwardly and rotates the U-shaped bar 420 in a counter clockwise direction (as seen in FIG. 8), thereby bringing the pivot point A below the line FB. Once the pivot point A passes below the line FB (i.e., line BD is below line FB), the gravity causes the first and second assemblies 310 and 315 to rotate in the counter-clockwise direction (as seen in FIG. 8) which causes the door 105 to close. This rotational motion, in turn, forces the gas strut 465b to compress and to rotate in a clockwise direction (as seen in FIG. 8) about pivot points C and D. When the force applied to close the door 105 is greater than the reaction force exerted by the gas strut 465b, the rotation motion of the gas strut 465b and the first link assembly 310 is sustained.

The compression of the gas strut 465b is maximum when the arn 460b is aligned with the gas strut 465b. In that configuration, the longitudinal direction of the gas strut 465b extending from pivot points C and D (line CD) substantially coincides with the line extending between pivot point B and D (line BD). Once the longitudinal direction CD of the gas strut 465b passes over the line BD, the gas strut 465b is no longer compressed and the reaction force F exerted by the gas strut 465b forces the first link assembly 310 to rotate in the counter clockwise direction. In this configuration, the gas strut 465b cooperates with the force applied to close the door 105.

It will be appreciated that the opening and closing of the door 105 may be done either manually or automatically. In this latter mode of operation, the force exerted to open and/or open the door 105 is provided via a motor. In another embodiment, the opening and closing of the door 105 may be done both manually and automatically. For example, a motor may be used to compress the gas strut 465b from its initial state to its maximum compression state so as to rotate the gas strut 465b over the line BD. Similarly, the motor may also be used to close the door by compressing the gas strut 465b.

Operation of the control mechanism 330 for opening and closing the door 105 will now be explained with references to FIGS. 10-14.

FIG. 10 is a bottom view of the door 105 in a fully opened position in accordance with an embodiment of the invention. The door 105 includes the first and the second link assembly 310, 315, and the first and the second latch mechanism 320, 325, which are configured to latch the door 105 to the fuselage 110. The first and the second latch mechanisms 320, 325 are operated via the control mechanism 330, which essentially comprises a handle 335 and three strings 340a, 340b, 340c. Strings 340a, 340b, 340c connect the handle 335 to the first and the second latch mechanisms 320, 325. Handle 335 includes a main body 336 that has a substantially disc shape, and a retractable portion 337 that can be rotated in order to control the first and second mechanisms 320, 325.

As best seen in FIG. 7, the first latch mechanism 320 is mounted to a wedge 705 that is affixed to the upper portion 305 of the door 105. The first latch mechanism 320 includes a body 710 that houses a hook 715 and a trigger 720. Cable 340a is connected to the trigger 720, such that when the retractable portion 337 rotates, the trigger 720 retracts in the body 710.

In this embodiment, the second latch mechanism 325 substantially functions the same way as the first latch mechanism 320. As can be seen in FIGS. 10 and 13, the second latch mechanism includes a first and a second body 1005a, 1005b, that are mounted to both ends 1010a, 1010b, of a plate 1015. The first and second bodies 1005a, 1005b each include a body 1020a, 1020b that houses a hook 1025a, 1025b and a trigger 1030a, 1030b, as shown in FIG. 13. As can be seen in FIG. 10, the strings 340b, 340c connect the triggers 1030a, 1030b. When the retractable portion 337 rotates, the strings 340b, 340c pull the triggers 1030a, 1030b, which retract in the bodies 1020a, 1020b.

Figure 11:
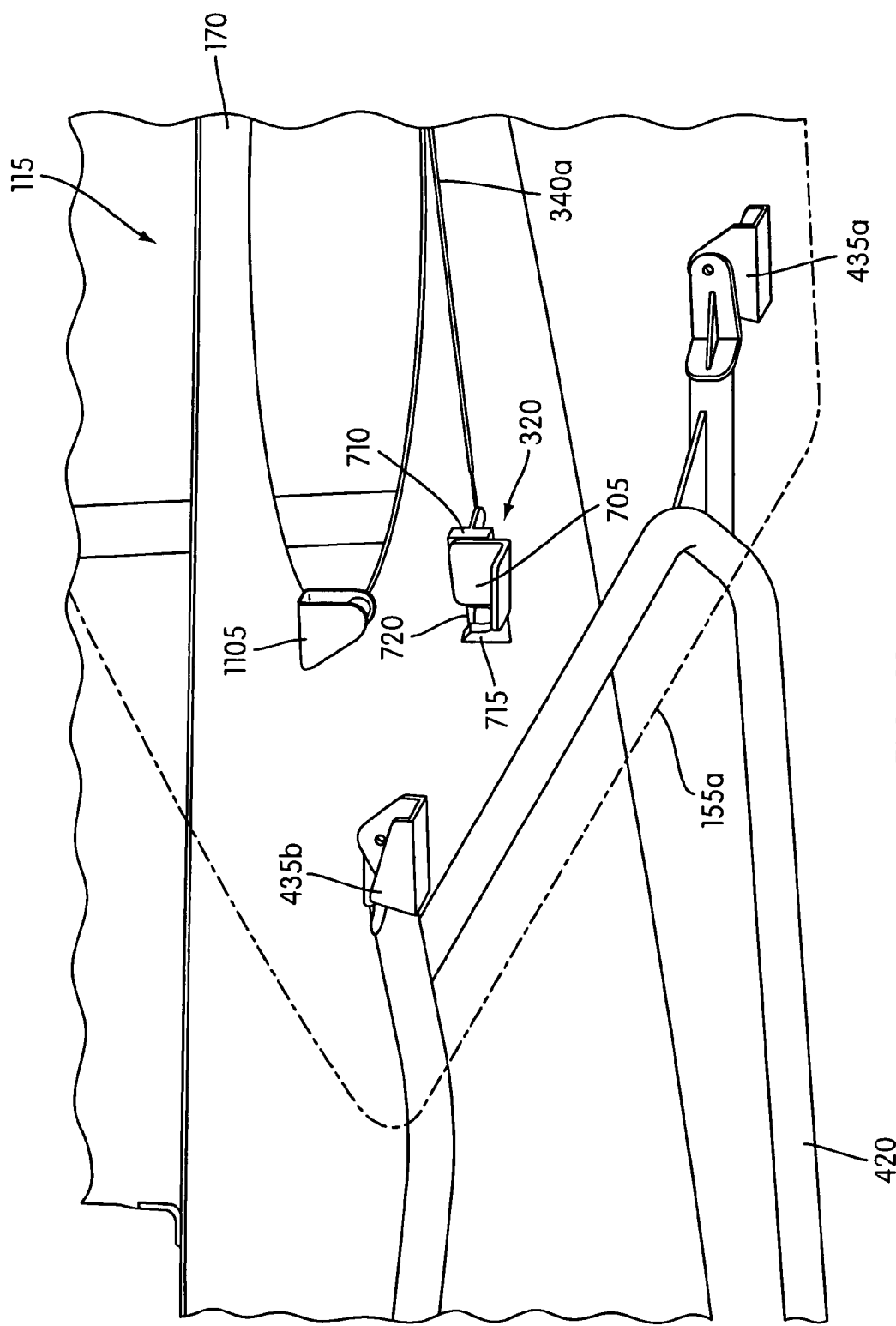
FIG. 11 is a view of a first latch mechanism mounted to the door in accordance with an embodiment of the invention.
Figure 12:
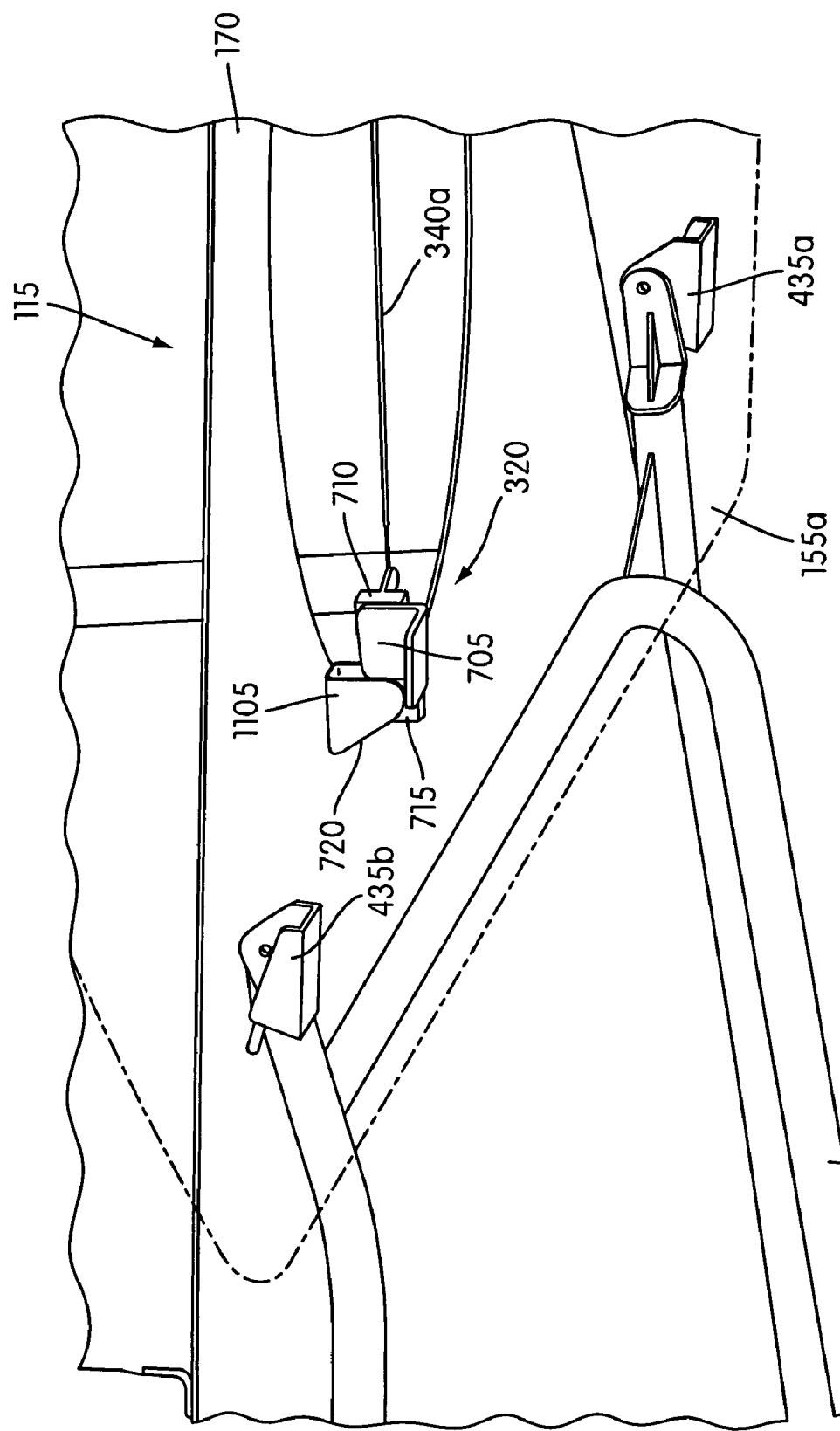
FIG. 12 is a view of the first latch mechanism when the door is in an opened position in accordance with an embodiment of the invention.

FIGS. 11 and 12 show the first latch mechanism 320 before and after the door 105 is in an opened and latched position. In FIG. 11, the first latch mechanism 320 is not engaged with the member 1105 arranged on an upper frame of the rearward tail portion 115. FIG. 12 shows a view of the latch mechanism engaged to the member 1105.

FIGS. 13 and 14 show the second latch mechanism 325 before and after the door 105 is in a closed and latched position. In FIG. 13, the second latch mechanism 325 is not engaged with the member 1305 that is arranged on an upper frame of the rearward tail portion 115. FIG. 14 shows a view of the latch mechanism engaged to the member 1305.

It will be appreciated that the opening and closing of the door 105 may be carried out manually or automatically. In this latter configuration, the operation of the first and second latch mechanisms 320, 325 may be controlled via a motor.

It will be appreciated that the concepts disclosed herein are equally applicable to structures other than those illustrated herein in the attached figures. For example, the door disclosed above may be incorporated into other types of aircrafts and vehicles, such as, for example, a tank, an hovercraft, etc.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention. For example, while the door disclosed above is mounted to a rear portion of a helicopter, other access openings may also be equipped with such a door.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. An aircraft vehicle comprising:
   a body, including a front portion and a rearward tail portion;
   a single panel door constructed and arranged to close an access opening defined in a lower portion of said body; and
   a linkage between said body and said door, said linkage constructed and arranged to move said door generally rearwardly and upwardly when said door is moved from a closed position to an opened position, so that said linkage retains the door in a position spaced below and adjacent said rearward tail portion, wherein said linkage comprises a first link assembly and a second link assembly, each of said first and said second link assembly including a first end portion pivotally connected to said body and a second end portion pivotally connected to said single panel.

2. The aircraft vehicle of claim 1, wherein a pivot point between said second end portion of said first link assembly and said single panel is above a line extending from a pivot point between said first end portion of said second link assembly and said body to a pivot point between said first end portion of said first link assembly and said body, when said door is in said opened position.

3. The aircraft vehicle of claim 1, wherein said first link assembly includes a third end portion pivotally connected to said body.

4. The aircraft vehicle of claim 3, wherein said third end portion includes an arm and a gas strut, said gas strut including a first end portion pivotally connected to said arm and a second end portion pivotally connected to said body.

5. The aircraft of claim 4, wherein said gas strut is configured to move said single panel inwardly when said second end portion of said gas strut pivots between a first position, in which said door is in said closed position, and a second position, in which a longitudinal axis of said gas strut coincides with a longitudinal axis of said arm.

6. The aircraft vehicle of claim 5, wherein a rotation angle defined by said gas strut between said first and said second position is about 8°.

7. The aircraft vehicle of claim 5, wherein said gas strut is configured to move said single panel upwardly when said gas strut rotates over an angle larger than a rotation angle defined by said gas strut between said first and said second position.

8. The aircraft vehicle of claim 1, further comprising a latch mechanism configured to latch said single panel to said body when said door is in said closed position and in said opened position.

9. The aircraft vehicle of claim 1, wherein said latch mechanism includes a first latch mechanism configured to latch said single panel when said door is in said opened position, a second latch mechanism configured to latch said single panel when said door is in said closed position and a control mechanism configured to control said first and second latch mechanism.

10. The aircraft vehicle of claim 1, wherein said single panel is disengaged from an outer edge that defines said access opening when said door is in said opened position.

11. The aircraft vehicle of claim 1, wherein said single panel is constructed and arranged to substantially envelope said tail rearward portion when said door is in said opened position.

12. The aircraft vehicle of claim 1, wherein an outer edge of said single panel is constructed and arranged to engage an outer edge of said access opening so as to form a seamless transition between said panel and said body when said door is in said closed position.

13. The aircraft vehicle of claim 1, wherein said single panel has a substantially concave interior shape and includes a central portion and a first and a second side portion.

14. The aircraft vehicle of claim 13, wherein said central portion tapers from wide to narrow from a first base portion to a second base portion, said second base portion being configured to engage a bottom portion of said rearward tail portion.

15. The aircraft vehicle of claim 1, wherein said vehicle is a helicopter or an aircraft.

16. A door for closing an access opening of a helicopter, said helicopter having a body including a front portion and a rearward tail portion, the door comprising:
a single panel door; and
a linkage between said body and said single panel door, said linkage constructed and arranged to move said single panel door generally rearwardly and upwardly when said door is moved from a closed position to an opened position, so that said linkage retains the door in a position spaced below and adjacent said rearward tail portion, wherein said linkage comprises a first link assembly and a second link assembly, each of said first and said second link assemblies including a first end portion pivotally connected to said body and a second end portion pivotally connected to said single panel.

17. The door of claim 16, wherein a pivot point between said second end portion of said first link assembly and said single panel is above a line extending from a pivot point between said first end portion of said second link assembly and said body to a pivot point between said first end portion of said first link assembly and said body, when said door is in said opened position.

18. The door of claim 16, wherein said first link assembly includes a third end portion pivotally connected to said body.

19. The door of claim 18, wherein said third end portion includes an arm and a gas strut, said gas strut including a first end portion pivotally connected to said arm and a second end portion pivotally connected to said body.

20. The door of claim 19, wherein said gas strut is configured to move said single panel inwardly when said second end portion of said gas strut pivots between a first position, in which said door is in said closed position, and a second position, in which a longitudinal axis of said gas strut coincides with a longitudinal axis of said arm.

21. The door of claim 20, wherein a rotation angle defined by said gas strut between said first and said second position is about 8°.

22. The door of claim 20, wherein said gas strut is configured to move said single panel door upwardly when said gas strut rotates over an angle larger than a rotation angle defined by said gas strut between said first and said second position.

23. An aircraft vehicle comprising:
a fuselage including a front portion and a rearward tail portion;
a single panel door constructed and arranged to close an access opening defined in a lower portion of the fuselage; and
a linkage between the fuselage and the door, the linkage constructed and arranged to pivot about three pivot axis and to move the door generally rearwardly and upwardly when the door is moved from a closed position to an opened position, so that the door is positioned below and adjacent to the rearward tail portion.

24. The aircraft vehicle of claim 23, wherein the linkage comprises a first link assembly and a second link assembly, each of the first and second link assembly including a first end portion pivotally connected to the fuselage and a second end portion pivotally connected to the single panel.

25. The aircraft vehicle of claim 24, wherein a pivot point between the second end portion of the first link assembly and the single panel is above a line extending from a pivot point between the end portion of the second link assembly and the fuselage to a pivot point between the first end portion of the first link assembly and the fuselage, when the door is in the opened position.

* * * * *